Aug. 7, 1962 C. J. CISLO 3,048,193
AIR SUSPENSION CONTROL APPARATUS
Filed Dec. 14, 1959 2 Sheets-Sheet 1

INVENTOR.
Casimer J. Cislo
BY
W. F. Wagner
ATTORNEY

INVENTOR.
Casimer J. Cislo
BY
W. H. Wagner
ATTORNEY

United States Patent Office 3,048,193
Patented Aug. 7, 1962

3,048,193
AIR SUSPENSION CONTROL APPARATUS
Casimer J. Cislo, Detroit, Mich., assignor to General Motors Corporation, Detroit, Mich., a corporation of Delaware
Filed Dec. 14, 1959, Ser. No. 859,167
11 Claims. (Cl. 137—627.5)

This invention relates to vehicle suspension and more particularly to control apparatus for pneumatic vehicle suspension.

An object of the invention is to provide an improved vehicle suspension.

A further object is to provide in an air suspended vehicle improved and simplified control apparatus for regulating the trim height of the vehicle sprung mass.

Yet another object is to provide an air suspension system incorporating control apparatus which is selectively operable to establish and maintain a plurality of defined trim heights for the sprung mass of a vehicle.

Yet a further object is to provide an air suspension leveling valve mechanism which is operable through a first range of movement to maintain the vehicle at a first predetermined trim height, the mechanism being adjustable responsive to remotely controlled pressure actuation to operate through a second and a third range of movement to maintain the vehicle at a second predetermined trim height and a third predetermined trim height.

A still further object is to provide a leveling valve mechanism incorporating improved overtravel mechanism to accommodate suspension deflection in excess of that required to actuate the leveling mechanism through its full range of movement.

These and other objects, advantages, and features of the invention will become more fully apparent as reference is had to the accompanying specification and drawings wherein.

Figure 1:
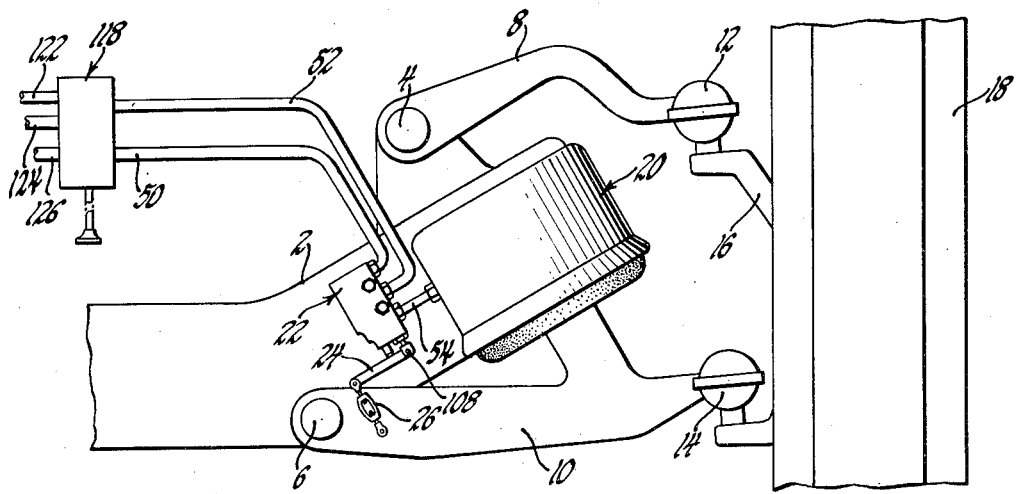
FIG. 1 is a schematic illustration of a dirigible wheel suspension incorporating the invention.

Referring now to the drawings and particularly FIG. 1, the invention is shown in relation to a dirigible wheel suspension wherein the reference numeral 2 designates the vehicle sprung mass in the form of a cross frame member. Pivotally attached at their inner ends to cross frame member 2 by pivots 4 and 6 are a pair of vertically spaced transversely extending control arms 8 and 10. At their outer ends, arms 8 and 10 are pivotally attached by ball joint assemblies 12 and 14, respectively, to a wheel knuckle assembly 16 upon which is rotatably mounted vehicle wheel 18. Sprung mass 2 is elastically supported relative to wheel 18 by means of an air spring assembly 20 interposed between the outer extremity of cross frame 2 and an intermediate portion of lower control arm 10. Air pressure within spring 20 is controlled by means of a leveling valve assembly 22 which is interposed between a source of air pressure, not shown, and the vehicle spring 20. The mechanism of assembly 22, shortly to be described, is actuated responsive to variation in the trim height of sprung mass 2 by means of a lever 24 and link 26 which interconnect assembly 22 and lower control arm 10.

Figure 2:
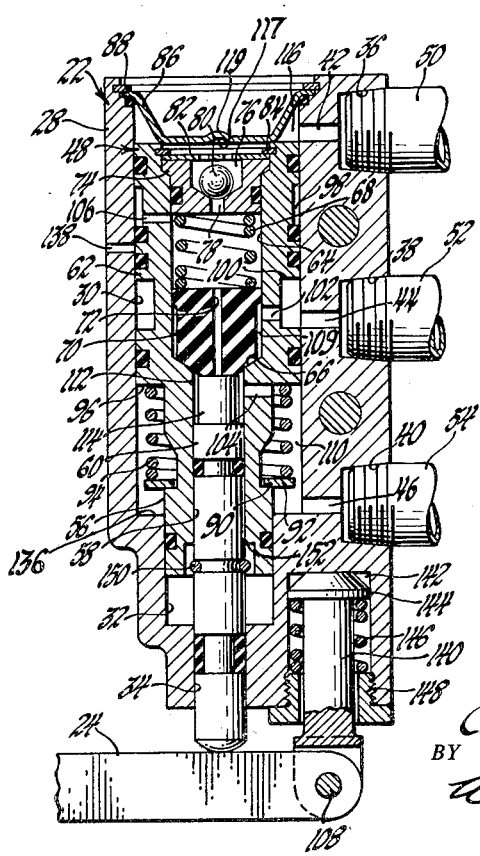
FIG. 2 is an enlarged sectional elevational view illustrating the details of construction of the leveling valve assembly, the various parts being shown in the relative positions occupied when the vehicle sprung mass is at the first predetermined trim height.

As seen best in FIG. 2, assembly 22 comprises a valve body 28 having a vertical passage extending completely therethrough which is formed by an upper bore 30, intermediate bore 32, and lower bore 34 which are arranged concentrically and in progressively stepped reduction in diameter. At vertically spaced intervals, valve body 28 is provided with transversely directed ports 36, 38, and 40 which communicate with upper bore 30 via passages 42, 44, and 46. Connected to ports 36, 38, and 40, respectively, is an exhaust conduit 50, an intake conduit 52, and a conduit 54 providing communication with spring 20. Slidably disposed in upper bore 30 and intermediate bore 32 is an annular core element 48. The lower portion 56 of core 48, in turn, is formed with a bore 58 in which is reciprocably disposed a plunger 60, the lower extremity of which slidably interfits lower bore 34 and extends outwardly therethrough for abutting engagement with lever 24. The upper portion 62 of core 48 is provided with a counterbore 64 terminating in a tapered shoulder 66. Disposed within counterbore 64 and resiliently maintained in seating engagement with shoulder 66 by means of a coil spring 68 is an elastomeric closure 70 having a vertical passage 72 formed therein. Disposed in the upper end of counterbore 64 is a plug 74 having a central cavity 76 merging with a vertical passage 78. Cavity 76 contains a ball check 80 which is retained therein by a perforated plate 82. A snap ring 84 disposed within a groove formed in core 48 serves to retain plate 82 and annular plug 74 in assembled relation. The entire core assembly is in turn retained within valve body 28 by a cup-shaped disk 86 which is locked in the upper end of valve body 28 by a second snap ring 88. Vertically midway thereof, lower portion 56 of core 48 is necked in to form a ledge 90 upon which is seated a washer 92. Washer 92 is normally retained in seating engagement with ledge 90 by a coil spring 94, the upper end of which seats on the annular ledge 96 at the base of upper core portion 56.

In order to effect fluid distribution in the manner shortly to be described, core 48 is formed with annular grooves 98 and 100 and associated radial passages 102, 104, and 106. The core assembly is provided with additional vertically spaced grooves in which are disposed O-rings which engage the bore 30 so as to allow reciprocable movement of core 48 therein while preventing internal leakage.

In order that the nature of the invention may be fully ascertained, a description of the mode of operation follows. Let it be assumed that the vehicle sprung mass 2 has descended from the first predetermined trim height. Such movement results in upward swinging movement of lever 24 about the axis of pivot 108 which in turn urges plunger 60 upwardly relative to the lower portion 56 of valve core 48, thereby lifting closure 70 from seat 66 against the pressure of spring 68. Upon displacement of closure 70, high pressure air enters port 38 from conduit 52 and passes into groove 100 through passage 44. From groove 100 high pressure air enters passage 102 in core 48 and flows downwardly around the annular clearance 109 between closure 70 and counterbore 64 and emerges through port 104 into the annular cavity 110 surrounding lower core portion 56. From cavity 110, high pressure air exits through passage 46 to port 40 and emerges through conduit 54 into spring 20. As soon as the internal pressure in spring 20 increases sufficiently to return the sprung mass 2 to the requisite level, lever 24 swings downwardly about pivot 108 until plunger 60 is allowed to descend under the influence of spring 68 to a position permitting closure 70 to resume seating engagement with valve seat 66, at which time high pressure air flow to spring 20 ceases. Conversely, if the vehicle sprung mass 2 has ascended above the predetermined trim height, lever 24 swings downwardly about pivot 108 allowing plunger 60 to move downwardly under the influence of spring air pressure present in the cavity 112 surrounding the reduced upper end 114 of plunger 60. As soon as plunger 60 moves downwardly away from abutting engagement with the lower end of closure 70, spring air pressure in cavity 112 is allowed to flow through passage 72 in closure 70 into cavity 64. From cavity 64 air flows through passage 78 in plug 74, lifts check valve 80, passes through perforated plate 82 and emerges into cavity 116 through passage 117 formed by ridge 119 of cup 86. From cavity 116, air emerges into exhaust conduit 50 through passage 42. Exhaust flow of air continues until the trim height of the vehicle has been restored whereupon lever 24 swings upwardly to restore plunger 60 to seating engagement with the lower end of closure 70. As will be apparent from the drawings and description, when the valve assembly is in the neutral position, the plunger 60 exerts pressure on closure 70 sufficient to seal passage 72 but not great enough to unseat the closure from valve seat 66.

Figure 3:
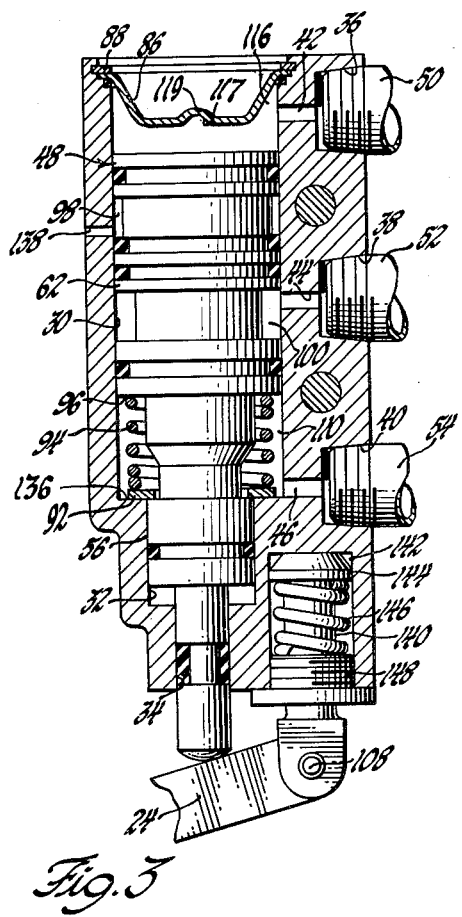
FIG. 3 is a view similar to FIG. 2, showing the relationship of the parts when the vehicle sprung mass is in the second predetermined trim height.

The operation just described concerns the leveling function of the device with respect to a single predetermined trim height. However, in accordance with the invention, there is provided additional control apparatus, by means of which the entire core assembly 48 may be shifted at the will of the operator, to two additional vertically displaced positions relative to casing 28 so that the sequence of operation just described will cause leveling of the vehicle at two additional predetermined trim heights. It will be evident that if the entire core assembly 48 is moved and maintained successively in three different vertical positions in casing 28, the angular relationship of control arm 10 relative to sprung mass 2 will necessarily change successively in order to restore the plunger 60 to abutting engagement with closure 70 and achieve fluid flow equilibrium. To accomplish this result in accordance with the present invention, there is provided a manually controlled remotely disposed valve mechanism 118 which is interposed between the source of fluid pressure, not shown, and leveling valve 22. As seen best in FIG. 5, valve 118 comprises a cylindrical casing 120 which at one side is connected to a pair of vertically spaced high pressure conduits 122 and 124. According to another feature of the invention, conduits 122 and 124 contain fluid under pressures of 125 p.s.i. and 175 p.s.i., respectively, the purposes of which will be described shortly. At its opposite side, casing 120 is connected to leveling valve 22 by the single intake conduit 52 and exhaust conduit 50. An exhaust port 126 in casing 120 provides communication between exhaust conduit 50 and atmosphere under conditions to be described. Reciprocably disposed in casing 120 is a spool valve 128 having a relatively short vertical slot 130 and an elongated vertical slot 132 at opposite sides thereof which are connected by a transverse passage 134. The vertical dimension and location of slots 130 and 132 is such that when in the position shown in FIG. 5, communication between pressure conduit 122 and intake conduit 52 occurs while communication between pressure conduit 124 and intake conduit 52 is prevented. Simultaneously, communication between exhaust port 126 and exhaust conduit 50 is accomplished. Therefore, with spool 128 in position 1, the operation of leveling valve 22 provides leveling of the sprung mass at a first predetermined trim height. However, upon downward vertical displacement of spool valve 128 to position No. 2, communication between intake conduit 52 and pressure conduit 122 continues; but due to the extended length of slot 132, exhaust conduit 50 is also brought into communication with intake conduit 122, thereby applying 125 p.s.i. to exhaust conduit 50 as well as intake conduit 52. This additional pressure in exhaust conduit 50 enters cavity 116 in housing 28 through passage 42 and urges the entire core assembly 48 vertically downwardly away from abutting engagement with cup 86 until washer 82 is brought into abutting engagement with the shoulder 136 at the base of bore 30 after which further downward movement of core 48 is arrested by the resistance exerted by coil spring 94. Therefore, core 48 is moved to the axial position shown in FIG. 3 and retained in such position as long as manual control valve is in position 2. With core 48 in the position shown in FIG. 3, it will be apparent that plunger 60 will initially be displaced upwardly relative to the core and cause closure 70 to be unseated and therefore admit high pressure air into the spring 20 in the manner previously described. As high pressure air enters spring 20, the spring mass 2 will rise and thereby progressively change the angular inclination of control arm 10 with the result that link 24 will gradually swing downwardly until plunger 60 is restored to a vertical position permitting seating of closure 70, while blocking passage 72 and thereby restoring flow equilibrium with the vehicle sprung mass at a second predetermined height substantially above the first predetermined height. Inasmuch as the normal exhaust path provided by exhaust conduit 50 is not capable of such function during the leveling action of valve 22 in the second predetermined height due to the presence of high pressure air therein, when the sprung mass momentarily rises above the second predetermined trim height, exhaust flow of air is admitted to atmosphere from cavity 64 in core 48 through radial passage 106 and the radial passage 138 in casing 28. It is to be observed that communication between passages 106 and 138 is blocked when core 48 is in the position shown in FIG. 1, but is brought into operation by axial displacement of the core which vertically aligns groove 98 with passage 138. Therefore, except for the secondary exhaust flow path just described, mechanical operation of valve 22 involved in leveling the sprung mass at the second predetermined trim height is the same as that described with reference to the first predetermined trim height.

Figure 4:
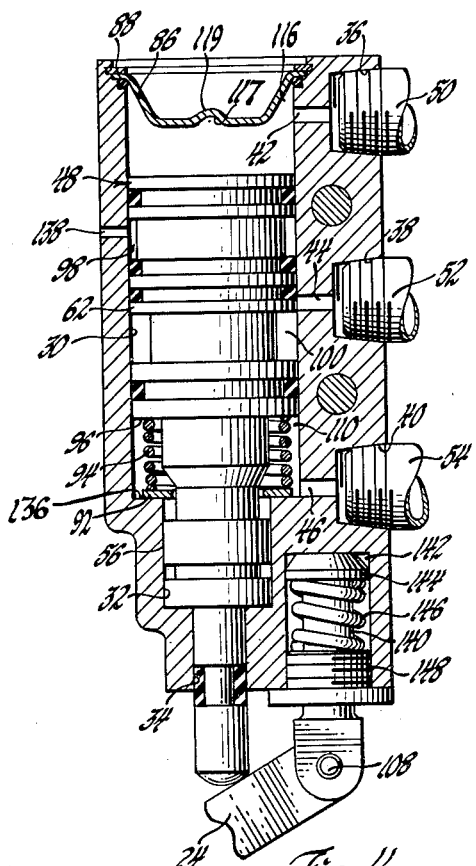
FIG. 4 is a view similar to FIG. 2, showing the relationship of the parts when the vehicle sprung mass is in the third predetermined trim height.
Figure 5:
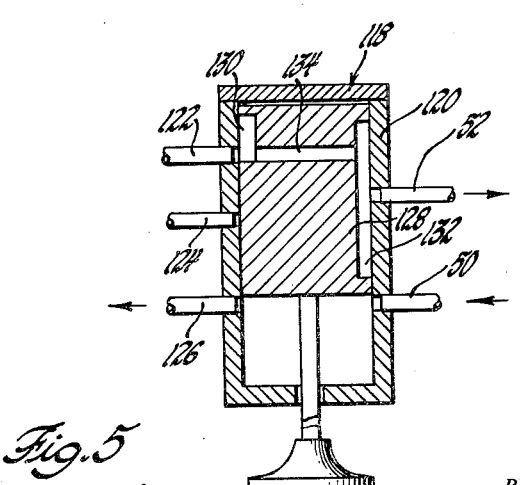
FIG. 5 is a sectional elevational view of the manual control shown schematically in FIG. 1.

Returning now to the manual control shown in FIG. 5, it will be seen that upon further downward displacement of spool valve 128, pressure conduit 124 will be brought into communicating relationship with both intake conduit 52 and exhaust conduit 50, while communication with pressure conduit 122 will be discontinued. With the increase in pressure in exhaust conduit 50, additional downward force is exerted on core 48 which is sufficient to overcome the resistnace of coil spring 94, with the result that core 48 descends axially to a third position wherein the coil sprnig is compressed to its mechanical limits (FIG. 4), thus established a third predetermined position for core 48. Once again, the plunger 60 is simultaneously urged upwardly relative to core 48 causing closure 70 to unseat and permit intake flow into spring 20 in the manner already described. Intake flow continues until sprung mass 2 has reached a third predetermined trim height during which time plunger 60 is allowed to descend by the downward angular movement of lever 24 and control arm 10 until closure 70 is once again seated and fluid flow restored to equilibrium. The exhaust flow path for the third leveling position is identical to that with respect to the second position, owing to the fact that groove 98 is sufficiently wide to maintain communication with port 138 through both the second and third stage of displacement of core 48.

In accordance with another feature of the invention, means are provided to accommodate wheel deflection which is in excess of that required to displace the plunger 60 through its full mechanical range of movement. In the embodiment illustrated, the pivot 108 by which the lever 24 is connected to leveling valve 22 is mounted on the lower end of a plunger 140 which is received in a vertically extending well 142 formed in casing 28 parallel with plunger 60. Plunger 140 is provided with an enlarged end 144 and has disposed around its stem portion a coil spring 146, the opposite ends of which engage end 144 and a sleeve 148 which surrounds the stem portion and threadably engages casing 28. It will be apparent from visual observation that upward swinging movement of lever 24 in excess of that required to bring the snap ring 150 on stem 60 into engagement with shoulder 152 on the lower portion 56 of core 48 will be accommodated by progressive compression of coil spring 146. However, during the normal range of plunger movement, the pressure of coil spring 146 is sufficient to firmly maintain plunger 140 in the position shown in FIG. 2 so that pivot 108 normally occupies a fixed position with respect to casing 28.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In combination, a three-stage leveling valve comprising a housing having an axially movable member slidably disposed therein, inlet and exhaust valve means mounted in said member, a plunger reciprocable in said housing to alternately engage and retract from said valve means, plunger actuating means hinged on said housing, remotely controlled means effective to displace said axially movable member from a first predetermined axial position in said housing, a resilient stop defining a second predetermined axial position for said axially movable member and a fixed abutment defining a third axial position for said axially movable member whereby opening and closing of said intake valve and exhaust results from swinging movement of said plunger actuating means through three predetermined ranges of angular movement.

2. In combination, a three-stage leveling valve comprising a housing having an axially movable member slidably disposed therein, inlet and exhaust valve means mounted in said member, a plunger reciprocable in said housing to alternately engage and retract from said valve means, plunger actuating means hinged on said housing, remotely controlled means effective to displace said axially movable member from a first predetermined axial position in said housing, a resilient stop defining a second predetermined axial position for said axially movable member, and a fixed abutment defining a third axial position for said axially movable member whereby opening and closing of said intake valve and exhaust valve results from swinging movement of said plunger actuating means through three predetermined ranges of angular movement, said remotely controlled means including a dual pressure source, and means for selectively applying one or the other of said dual pressures to said axially movable member.

3. In combination, a three-stage leveling valve comprising a housing having an axially movable member slidably disposed therein normally occupying a first predetermined axial position, inlet and exhaust valve means mounted in said member, a plunger reciprocable in said member operatively engaging said valve means so that opposite axial movement of the former causes intake and exhaust flow through said housing, plunger actuating means hinged on said housing, a resilient stop defining a second predetermined axial position for said axially movable member, and a fixed abutment defining a third axial position for said axially movable member, means for exerting a first fluid pressure on said axially movable member to induce the latter to the second predetermined position, and means for increasing the said first fluid pressure sufficient to override said resilient stop and move said axially movable member against said fixed stop, whereby opening and closing of said intake and exhaust valve results from swinging movement of said plunger actuating means through three predetermined ranges of angular movement.

4. A three-stage leveling valve for a vehicle having air springs, said valve comprising a housing having an axially movable member slidably disposed therein, means mounted in said member forming concentric inlet and exhaust valve means, a plunger slidable in said member engageable with and retractable from said means to control intake and exhaust air movement, a plunger actuating lever pivoted on said housing, means forming an inlet port and an exhaust port in said housing, remotely controlled means acting through said exhaust port to selectively exert force of two different magnitudes to displace said axially movable member from a first predetermined axial position to a second and third predetermined axial position in said housing whereby intake and exhaust air movement, respectively, results from swinging movement of said lever through a first, second, and third range of angular movement.

5. The structure set forth in claim 4 wherein the second and third predetermined axial positions of said axially movable member are defined by a resilient stop carried by said member and a fixed abutment formed on said housing.

6. A three-stage leveling valve for a vehicle having air springs, said valve comprising a housing having an axially movable member slidably disposed therein, means mounted in said member forming concentric inlet and exhaust valve means, a plunger slidable in said member engageable with and retractable from said means to control intake and exhaust air movement, a plunger actuating lever pivoted on said housing, means forming an inlet port and an exhaust port in said housing, a first and a second source of fluid pressure acting through said exhaust port to selectively exert force of two different magnitudes to displace said axially movable member from a first predetermined axial position to a second and third predetermined axial position in said housing whereby intake and exhaust air movement, respectively, results from swinging movement of said lever through a first, second, and third range of angular movement.

7. A three-stage leveling valve for a vehicle having air springs, said valve comprising a housing having an axially movable member slidably disposed therein, means mounted in said member forming concentric inlet and exhaust valve means, a plunger slidable in said member engageable with and retractable from said means to control intake and exhaust air movement, a plunger actuating lever pivoted on said housing, means forming an inlet port and an exhaust port in said housing, an intake conduit conneceted to said inlet port, an exhaust conduit connected to said exhaust port, a first high pressure conduit, a second high pressure conduit, the pressure in the first conduit being substantially higher than in the second, a manually operated valve connecting said first and second conduits with said intake and exhaust conduits, and control means in said last mentioned valve operable to selectively connect said exhaust conduit with either of said pressure conduits, pressure from said first high pressure conduit acting to displace said axially movable member from a first predetermined axial position to a second predetermined axial position and pressure from said second high pressure conduit acting to displace said axially movable member to a third predetermined axial position in said housing whereby intake and exhaust air movement, respectively, results from swinging movement of said lever through a first, second, and third range of angular movement.

8. In a device of the class described, a fixed housing having a main cylindrical bore, an inlet port and an exhaust port formed in said housing, an annular core member slidably disposed in said bore and normally maintained in a first axial position, said annular member having a bore and counterbore forming a tapered valve seat, a flexible closure axially slidable in said counterbore and spring urged into engagement with said valve seat, means forming an axial passage in said closure, a plunger axially slidably disposed in said bore and normally engaging said closure so as to block said passage without displacing said closure from said valve seat, a lever pivoted on said housing acting on said plunger so that the latter displaces said closure from said valve seat upon swinging movement of said lever in one direction, swinging movement of said lever in the other direction allowing said plunger to retract from said closure so that the latter engages said seat with said passage open, and means defining two additional axial positions for said annular core member, said means comprising an annular ring surrounding said annular core member and spring biased against an annular ledge thereon, and an annular abutment on said housing engageable with said annular ring after movement of said annular core member to the first of said two additional axial positions.

9. In a device of the class described, a fixed housing having a main cylindrical bore, said housing having an inlet port and an exhaust port formed therein communicating with said bore in axially spaced relation, an annular valve core slidably disposed in said bore and normally maintained in a first axial position at one end of said bore, said core member having a bore and counterbore forming a tapered valve seat, a flexible closure axially slidable in said counterbore and spring urged into engagement with said valve seat, said closure having an upper flange portion and a lower body portion spaced from the wall of said counterbore, means forming an axial passage in said closure, a plunger axially slidably disposed in said bore and normally abuttingly engaging said closure so as to block said passage without displacing said closure from said valve seat, a lever pivoted on said housing acting on said plunger so that the latter displaces said closure from said valve seat upon swinging movement of said lever in one direction, swinging movement of said lever in the other direction allowing said plunger to retract from said closure so that the latter engages said seat with said passage open, and means defining two additional axial positions for said annular valve core, said means comprising an annular member surrounding said annular valve core and spring biased against an annular ledge thereon, an annular abutment on said housing engageable with said annular member after movement of said annular valve core to the first of said two additional axial positions, and a second annular abutment on said housing engageable with said annular valve core after movement of the latter to the second of said two additional positions.

10. The structure set forth in claim 8 wherein said annular member surrounding said annular core member is spring biased by a coil spring surrounding said annular core member axially adjacent said annular member.

11. The structure set forth in claim 7 including spring means mounted on said axially movable member and engageable with said housing upon movement of the axially movable member to the second predetermined axial position, said spring means providing resilient resistance equal to the pressure in the first conduit.

References Cited in the file of this patent

UNITED STATES PATENTS

| | | |
|---|---|---|
| 2,733,931 | Reid | Feb. 7, 1956 |
| 2,942,623 | Schwartz | June 28, 1960 |

UNITED STATES PATENT OFFICE

CERTIFICATE OF CORRECTION

Patent No. 3,048,193                      August 7, 1962

Casimer J. Cislo

It is hereby certified that error appears in the above numbered patent requiring correction and that the said Letters Patent should read as corrected below.

Column 1, line 12, for "objection" read -- object --; column 4, line 3, for "82" read -- 92 --; line 15, for "spring" read -- sprung --; column 5, line 34, after "exhaust" insert -- valve --; column 6, line 51, for "connecèted" read -- connected --.

Signed and sealed this 27th day of November 1962.

(SEAL)
Attest:
ESTON G. JOHNSON
Attesting Officer

DAVID L. LADD
Commissioner of Patents